(12) United States Patent
Tien

(10) Patent No.: US 7,316,985 B2
(45) Date of Patent: Jan. 8, 2008

(54) BREATHABLE AND WATERPROOF LINING STRUCTURE FOR FOOTWEAR AND GARMENT

(76) Inventor: Frank Tien, 4751 Littlejohn St., Unit A, Baldwin Park, CA (US) 91706

(*) Notice: Subject to any disclaimer, the term of this patent is extended or adjusted under 35 U.S.C. 154(b) by 268 days.

(21) Appl. No.: 10/825,728

(22) Filed: Apr. 16, 2004

(65) Prior Publication Data

US 2005/0233658 A1  Oct. 20, 2005

(51) Int. Cl.
*B32B 5/18* (2006.01)
*A43B 23/07* (2006.01)

(52) U.S. Cl. .......................... 442/224; 442/62; 442/76; 442/85; 442/86; 442/152; 442/164; 442/172; 442/221; 442/315; 442/370; 442/373; 36/55; 428/304.4

(58) Field of Classification Search ............ 442/62, 442/76, 86, 152, 164, 172, 221, 224, 315, 442/370, 373, 85; 428/304.4; 36/55
See application file for complete search history.

(56) References Cited

U.S. PATENT DOCUMENTS

| | | | |
|---|---|---|---|
| 3,608,006 A * | 9/1971 | Hosoda et al. ............ | 264/46.1 |
| 4,435,346 A * | 3/1984 | Ito et al. ..................... | 264/54 |
| 4,446,254 A * | 5/1984 | Nakae et al. .............. | 521/50.5 |
| 5,169,712 A * | 12/1992 | Tapp ........................ | 428/315.5 |
| 5,242,634 A * | 9/1993 | Matsumoto et al. ........ | 264/420 |
| 6,517,764 B2 * | 2/2003 | Shibata et al. ............. | 264/424 |

FOREIGN PATENT DOCUMENTS

| | | | |
|---|---|---|---|
| JP | 56146732 | * | 11/1981 |
| JP | 56146732 A | * | 11/1981 |

OTHER PUBLICATIONS

Wikipedia information about "low-density polyethylene" (no date).*

* cited by examiner

*Primary Examiner*—Andrew T Piziali
(74) *Attorney, Agent, or Firm*—Raymond Y. Chan; David and Raymond Patent Group

(57) ABSTRACT

A waterproof and breathable lining structure includes a sheet-like waterproof and breathable foaming cushion layer made of a composition of a predetermined amount of low density polyethylene (LDPE) and a predetermined amount of foaming agent such as azodicarbonamide (ADCA), and a fabric lining layer integrally adhered to one side of the cushion layer to form the lining structure. The cushion layer is made by a process including the steps of: (a) palletizing raw materials including the low density polyethylene and the foaming agent such as Azodicarbonamide (ADCA); (b) extruding the palletized raw material to make a solid sheet; (c) cross-linking the solid sheet by an E-beam to form an irradiated matrix; (d) foaming the irradiated matrix into the sheet-like foaming cushion layer.

4 Claims, 2 Drawing Sheets

BREATHABLE AND WATERPROOF LINING STRUCTURE FOR FOOTWEAR AND GARMENT

BACKGROUND OF THE PRESENT INVENTION

1. Field of Invention

The present invention relates to a kind of lining structure, more particularly, relates to a lining structure employing a kind of an irradiation cross-linked, foam sheet product, which is water repellent and air breathable to be used in shoe making and garment industry.

2. Description of Related Arts

Commonly, people desire to seek a pair of dry and comfort shoes. This is due to the fact that dry feet make a huge difference when walking in the rain or in a wet working environment. Likewise, waterproof garments are also under heavy requirements in different applications especially in rainy regions. People wish to keep drier by remaining waterproof after exposures to a wet circumstance, particularly those people who frequently encounter to contaminants such as perspiration, oils, fuels, rains, detergents, and so on.

Thanks to the development of the modern chemistry industry, waterproof products are available, such as the traditional water repellent fabric bases on polyurethane chemistry which may degrade with exposure to cold, flexing, and chemicals. Instead, the GORETEX™ and SYMPATEX™ materials utilize a fundamentally different bi-component membrane technology than traditional fabrics by combining the breathability with the durable waterproofness.

Undertaken an exercise of intensity while wearing waterproof or water-resistant clothes, people would feel uneasiness. Under that kind of condition, body moisture evaporated from the skin for the purpose of cooling is unable to escape due to the overlying barrier that is the fabric of the garment.

As a result, these current waterproof materials, such as GORETEX™ or SYMPATEX™, could allow perspiration vapor to escape from the garment and shoe, so the wearer feel more comfortable. In other words, GORETEX™ and SYMPATEX™ fabric allows more sweat vapor to be released than other waterproof fabric alternatives so wearer could stay drier and cooler in warmer, wetter conditions. It is worth to mention that this sweat vapor transferring also helps prevent conductive heat loss in cold weather by keeping wearer's body and clothing layers drier.

In short, the current materials have the property that water vapor in the air may pass through its pores, but liquid water may not, commonly said to be 'breathable'. So through the wonders of physics and chemistry, the same impenetrable water barrier actually transport perspiration, so user's body could breath.

Currently, the production of these current waterproof fabrics is mainly based on the laminating processes. Among those products, GORETEX™ from W. L. Gore, an American company, and SYMPATEX™ from Europe are undoubtedly dominating ones on the market. Both GORETEX™ and SYMPATEX™ employed the laminating process which involves a process in which a layer of lining film is adhered onto a layer of fabric.

However, this kind of current waterproof material also suffers some drawbacks. First of all, the production process is too expensive to be afforded by common consumers. This is due to the fact that the application of these laminating equipments cannot be applied using existing textile production processes. Second, synthesis of the lining film is costly and garments with this waterproof modification are significantly expensive like luxury goods. Meanwhile, although SYMPATEX™ is 100% waterproof, it is essential that the outer fabric also has a water repellent finish. Otherwise, the outer fabric would soak up the water and the garment would become unnecessary heavy.

As a result, it is highly desirable to develop an inexpensive lining structure, which is capable of being used in shoe making and garment industry as a substitute alternative material, wherein said lining structure is water proof and air breathable, and preferably, made of cheaper traditional waterproof materials.

SUMMARY OF THE PRESENT INVENTION

A main object of the present invention is to provide a kind of inexpensive lining structure, which is water proof and air breathable, being used for waterproof shoes and garments.

Another object of the present invention is to provide a kind of inexpensive lining structure, which is water proof and air breathable, as a substitute alternative material that doesn't need expensive producing equipments and costly raw materials.

Another object of the present invention is to provide a kind of inexpensive waterproof and air breathable lining structure, which offers satisfied strength and durability to be used as lining layer in footwear and garments.

Accordingly, in order to accomplish above objects, the present invention provides a waterproof and breathable lining structure comprising;

a sheet-like waterproof and breathable foaming cushion layer made of a composition of a predetermined amount of low density polyethylene (LDPE) and a predetermined amount of foaming agent such as azodicarbonamide (ADCA); and a fabric lining layer integrally adhered to one side of the cushion layer to form the lining structure.

In an embodiment of the present invention, the waterproof and breathable lining structure further comprises a sheet of cover layer made of fabric material integrally adhered to another side of the cushion layer to act as an interior surface of the lining structure to contact with a wearer while the lining layer acting as an exterior surface to enable better gluing ability with the outside layer of a footwear or a garment product.

The waterproof and breathable foaming cushion layer is made by a process comprising the steps of:

(a) Palletizing raw materials including the low density polyethylene and the foaming agent such as Azodicarbonamide (ADCA);

(b) Extruding the palletized raw material to make a solid sheet;

(c) Cross-linking the solid sheet by an E-beam to form an irradiated matrix;

(d) Foaming the irradiated matrix; and (e) Cutting and seaming the irradiated matrix into the predetermined shape.

These and other objectives, features, and advantages of the present invention will become apparent from the following detailed description, the accompanying drawings, and the appended claims.

DETAILED DESCRIPTION OF THE PREFERRED EMBODIMENT

Figure 1:
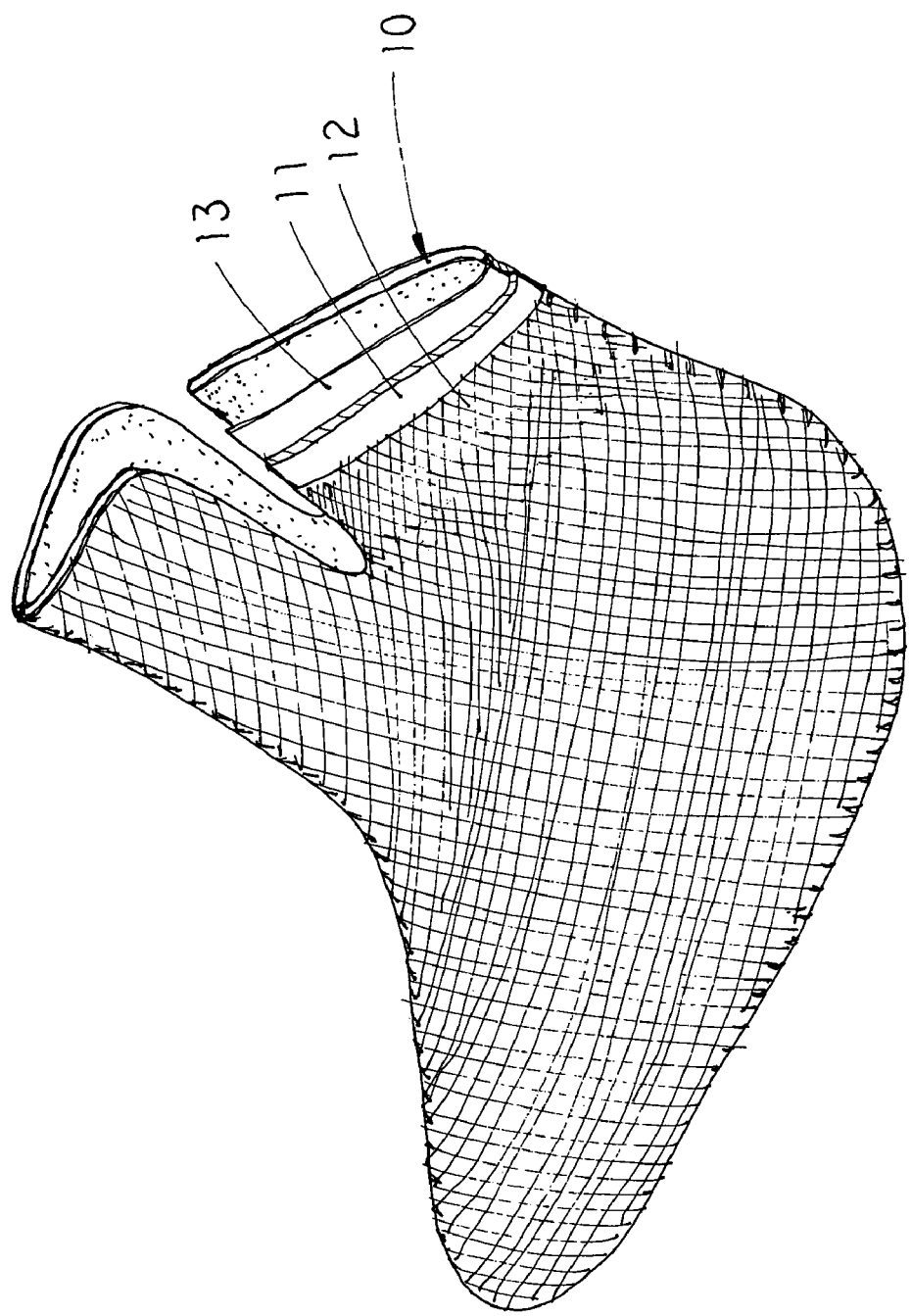
FIG. 1 is a perspective view of a breathable & waterproof lining structure which is made into an interior lining structure of a shoe according to a preferred embodiment of the present invention.
Figure 2:
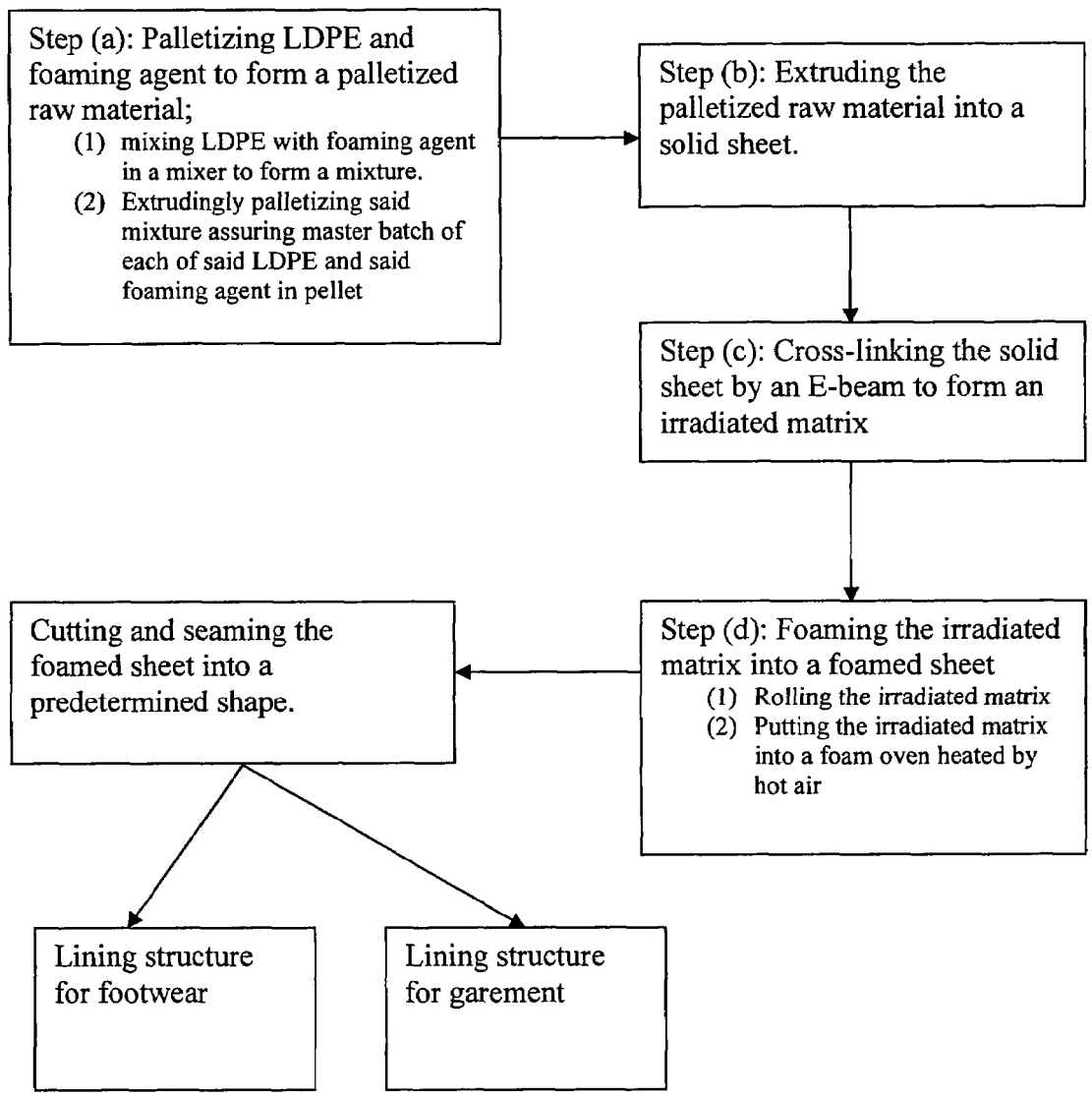
FIG. 2 is a block diagram illustrating the process for producing the lining structure according to the preferred embodiment of the present invention.

The present invention provides a waterproof and breathable lining structure which is embodied to produce a shoe lining structure for footwear such as boot as shown in FIG. 1. Of course, it can also be made as the lining structure of garment product such as a jacket.

The waterproof and breathable lining structure 10 of the present invention comprises a sheet-like waterproof and breathable foaming cushion layer 11 and a fabric lining layer 12 integrally adhered to one side of the cushion layer to form the lining structure.

According to the preferred embodiment of the present invention, the waterproof and breathable lining structure 10 further comprises a sheet of cover layer 13 made of fabric material integrally adhered to another side of the cushion layer 11 to act as an interior surface of the lining structure 10 to contact with a wearer while the lining layer 12 acting as an exterior surface to enable better gluing ability with the outside layer of a footwear or a garment product.

The lining structure 10 to be used in footwear and garments is produced by using polyolefin materials and additives such as foaming agents. According to the preferred embodiment of the present invention, the sheet-like waterproof and breathable foaming cushion layer 11 is made of a composition of a predetermined amount of low density polyethylene (LDPE) and a predetermined amount of foaming agent such as azodicarbonamide (ADCA).

A producing method for preparing the lining structure 10 which is water repellent and air breathable comprises the steps of:

(a) palletizing raw materials;

(b) extruding the palletized raw materials to make a solid sheet;

(c) cross-linking the solid sheet by an electron-beam to form an irradiated matrix;

(d) foaming the irradiated matrix into the sheet-like foaming cushion layer; and (e) cutting and seaming the foaming cushion layer into predetermined shape.

Furthermore, to improve the properties of the polyolefin materials, its production adopts irradiation technology as a key process, and polyolefin molecules are crosslinked by electron-beam irradiation in this process. Finally, the materials are foamed at general atmosphere and high temperature to provide a foamed material possessing water repellent and air breathable property.

Accordingly, the polyethylene is cross-linked by irradiation. And the foam material is formed by the employment of chemical foaming agents. Typically, a cross-linked, polyethylene foam sheet material is provided by mixing a predetermined amount of foaming agent into the polyethylene material in an extruder, and then the cross-linking process is subsequently followed to form a matrix sheet. Finally, the matrix material is conveyed through an oven and expanded into a generally flat, cross-linked, sheet material.

As a result, the step (a) further comprises the steps of:

(a-1) mixing Polyolefin pellet with foam agent as well as other additives in a mixer to form a mixture;

(a-2) extrudingly palletizing the mixture assuring master batch of each raw material in pellet.

Preferably, the polyolefin material is the LDPE (low density polyethylene) or PP (polypeplene). Polyethylene (PE) possesses a number of beneficial physical and chemical properties when used to produce a foamed sheet, which is crucial in this present invention, since PE/PP is water repellent whereas air channel are existed for air permeability.

In addition, PE foam material has fine cell air bubble and smooth surface. Meanwhile, the forming process of the LDPE is flexible with a foaming range from 3 times to 40 times. As a result, the user could adjust the foaming process according to different applications in shoe making process.

According to the preferred embodiment of the present invention, the foaming agent is Azodicarbonamide (ADCA), the additives include ZnO(Zinc-Oxide), ZnSt(Zinc Stearate), and pigment. And the reaction process comprises above mentioned raw material with a formulation ratio 100 phr LDPE, 18 phr ADCA, 0.1 phr ZnO, 0.1 phr ZnSt, and 1.0 phr pigment.

In the step (b), all master batches of every material according to the formulation ratio is put into an extruder to be extruded into a mother sheet.

In the step (c), according to the preferred embodiment of the present invention, the mother sheet is cross linked by an electron-beam (irradiation). The producing method of the present invention adopts irradiation technology as a key process, and the raw materials' molecules are crosslinked by electron-beam irradiation in this process. Here, crosslinked polymers are usually molded and shaped before they are crosslinked. As a result, the lining structure in the present invention prepared by this cross linking process has superb strength as well as prolonged durability.

As mentioned before, although SYMPATEX™ is 100% waterproof, it is essential that the outer fabric also has a water repellent finish. Otherwise, the outer fabric would soak up the water and the garment would become unnecessary heavy. So, the GORETEX™ or SYMPATEX™ membrane is rather thin for reserving more space to outer shell materials. Inevitably, the durability and strength is not satisfied. Accordingly, the outer shell of shoe or garment has to be specially prepared for ensuring material durability. While the lining structure according to the first preferred embodiment of the present invention is a foamed sheet of prolonged durability, the thickness of outer shell of shoe or garments could be substantially reduced and materials source of outer shell could be broadened.

Furthermore, irradiation cross-linking technology also facilitates polymer surface. Meanwhile, it also provides a method that makes an open cell cellular body of polyethylene resin material in crosslinked structure, which has a maximum degree of cell interconnection, which is good in recyclability and excellent in heat resistance or resistance to heat distortion. What is more, the open cell cellular body of polyethylene resin and the well interconnection of cell make it possible for air permeable. So the IEPE foam in the present invention has desirable properties which are comparable with that of GORETEX™ and SYMPATEX™.

Also, the step (d) of the producing process further comprises the steps of:

(1) rolling said irradiated matrix; and (2) putting said irradiated matrix into a foaming oven heated by hot air.

As a result, the materials are foamed at general atmosphere and high temperature. It is worth to mention that during the foaming process in the step (d), the open cell cellular body is further foamingly expanded thereby the air permeability is assured.

Conclusively, the producing method of the present invention involves making a polyethylene resin open cell cellular body by partially decomposing a foaming (expanding) and a crosslinking agent in a foamable and crosslinkable composition of polyethylene resin material in a closed mold, then decomposing the remaining parts of the foaming and crosslinking agents under an atmospheric pressure to obtain a body with closed cells from the composition, and finally compressing the thus obtained body to cause the closed cells to be destructed thereby providing air permeability. As a result, the final foam sheet could be used as lining materials which is waterproof, thanks to PE's water-repellent property, and air breathable.

Before the step (e), the producing process may further comprises the steps of attaching the fabric lining layer 12 to one side of the cushion layer 11 and attaching the sheet of cover layer 13 to another side of the cushion layer 11 to form integral layers of the lining structure 10.

In the step (e), the foamed sheet could be cut into predetermined shape to be used as lining layer in footwear or garments. As known in the art, different foamed sheet could be seamed together by thermoplastically sealed the stitching edge of said foamed sheet.

The lining structure 10 prepared by the producing method of the present invention has a better compatibility with outer fabric. Here, the outer fabric lining layer 12 may be of any suitable garment fabric, ranging from fully waterproof, coated or laminated fabric. Fabrics which could be utilized for the lining layer 12 range from single or multilayer fully waterproof fabrics which may be laminated with a waterproof layer, or coated or uncoated fabrics, with or without a water repellent treatment. This is due to the fact that the foaming cushion layer 11 in the present invention has a flexible thickness thereby proving an adjustable waterproof and air breathable function.

In short, the foaming cushion layer 11 of the present invention can be a substantially continuous sheet, lining most of the shoes and the garment. Since the foamed material is so elastic, any cut opening could be provided on the sheet for easy deformation to be accommodated inside a shoe mode. More importantly, the foaming cushion layer 11 could be cut into various shapes to maximize air exchange and to give better flexibility and movement to the shoes and garments.

To sum up, according to the present invention, it is possible to easily produce a polyethylene extruded foam having an elongation, tensile strength and durability improved over those of the conventional water proof extruded foams, and particularly, it is possible to easily produce a long and thin sheet-like polyethylene extruded foam which is water repellent and air breathable as a substitute alternative material being used in shoe-making and garment industry.

The following table illustrates the result of the present invention in a Maeser Flex-ASTM D2099-00 test for two pieces of sample of lining structure of the present invention:

| Sample ID: | Aquashield Membrane | | |
| --- | --- | --- | --- |
| Test Specimen ID | #1 | #2 | Suggested Minimum* |
| Initial weight (grams) | .946 | .950 | N/A |
| Final weight (grams) | .950 | .951 | N/A |
| % Percent of water Absorbed | .42 | .11 | 11 5-11% max. |
| No. of flexes | 28,000 | 28,000 | 20,000-25,000 |
| Water penetration Yes or No | No | No | No |

*For US Shoe manufacturers

In view of the above table, the wateproofness of the lining structure 10 according to the present invention is illustrated. It is seen that no water penetration has been tested on the product.

The following table illustrates the result of the present invention in a Moisture Vapor Transmission-ASTM E96-95 test for two pieces of sample of lining structure of the present invention:

| | Aquashield Membrane | | Suggested minimum* |
| --- | --- | --- | --- |
| Sample ID: | g/m$^2$/hr | mg/cm$^2$/hr | mg/cm$^2$/hr |
| #1 | 70 | 7.0 | 20 |
| #2 | 95.5 | 9.55 | |
| Average | 82.75 | 8.28 | |

*Suggested minimum for uppers or combination of materials

In view of the above table, the air breathability of the lining structure 10 according to the present invention is illustrated. It is seen that air permeability is desirable.

One skilled in the art will understand that the embodiment of the present invention as shown in the drawings and described above is exemplary only and not intended to be limiting.

It will thus be seen that the objects of the present invention have been fully and effectively accomplished. It embodiments have been shown and described for the purposes of illustrating the functional and structural principles of the present invention and is subject to change without departure form such principles. Therefore, this invention includes all modifications encompassed within the spirit and scope of the following claims.

What is claimed is:

1. A shoe lining structure for a boot having an outer shell, comprising:

a pair of interior linings each of which is cut into a boot shape, wherein said interior linings are stitched edge to edge together to form stitching edges, wherein said stitching edges of said interior linings are further thermoplastically seamed together to form said shoe lining structure for fitting into said outer shell of said boot, wherein each of said interior linings consist of a sheet-like waterproof and air breathable foaming cushion layer, a lining layer integrally attached to one side of said foaming cushion layer, and a cover layer integrally attached to another side of said foaming cushion layer, wherein said foaming cushion layer is made of a composition of low density polyethylene, a foaming agent including azodicarbonamide, a pigment, and additives including Zinc Oxide and Zinc Stearate integrally mixing with said low density polyethylene and said foaming agent;

wherein said foaming cushion layer is made by irradiation technology wherein raw materials including said polyethylene, said azodicarbonamide, said Zinc Oxide, said Zinc Stearate, and said pigment are palletized to make a solid sheet which polyolefin molecules are crosslinked by electron-beam irradiation to form an irradiated matrix, wherein said irradiated matrix is foamed at normal atmosphere and high temperature to have water repellant and air breathable properties to obtain said sheet-like foaming cushion layer.

2. The shoe lining, as recited in claim 1, wherein said raw materials include 100 phr of said polyethylene (LDPE), 18 phr of said azodicarbonamide (ADCA), 0.1 phr of said Zinc Oxide (ZnO), 0.1 phr of said Zinc Stearate (ZnSt), and 1.0 phr of said pigment.

3. A footwear, comprising:

a boot having an outer shell; and a shoe lining structure, which is fitted into said outer shell of said boot, comprising a pair of interior linings each of which is cut into a boot shape, wherein said inner linings are stitched edge to edge together to form stitching edges, wherein said stitching edges of said interior linings are further thermoplastically seamed together to form said shoe lining structure for fitting into said outer shell of said boot, wherein each of said interior linings consist of a sheet-like waterproof and air breathable foaming cushion layer, a lining layer integrally attached to one side of said foaming cushion layer, and a cover layer integrally attached to another side of said foaming cushion layer, wherein said foaming cushion layer is made of a composition of low density polyethylene, a foaming agent including azodicarbonamide, a pigment, and additives including Zinc Oxide and Zinc Stearate integrally mixing with said low density polyethylene and said foaming agent, wherein said foaming cushion layer is made by irradiation technology wherein raw materials including said polyethylene, said azodicarbonamide, said Zinc Oxide, said Zinc Stearate, and said pigment are palletized to make a solid sheet which polyolefin molecules are crosslinked by electron-beam irradiation to form an irradiated matrix, wherein said irradiated matrix is foamed at normal atmosphere and high temperature to have water repellant and air breathable properties to obtain said sheet-like foaming cushion layer.

4. The footwear, as recited in claim 3, wherein said raw materials include 100 phr of said polyethylene (LDPE), 18 phr of said azodicarbonamide (ADCA), 0.1 phr of said Zinc Oxide (ZnO), 0.1 phr of said Zinc Stearate (ZnSt), and 1.0 phr of said pigment.

* * * * *